3,149,106
METHOD OF PREPARATION OF HETEROCYCLIC COMPOUNDS
Bernard Loev, Broomall, Pa., assignor to Smith Kline & French Laboratories, Philadelphia, Pa., a corporation of Pennsylvania
No Drawing. Filed Feb. 23, 1962, Ser. No. 175,337
4 Claims. (Cl. 260—243)

This invention relates to a novel method of preparing heterocyclic compounds by the use of carbodiimides.

The heterocyclic compounds prepared by the process of this invention have utility as pharmacodynamic agents particularly as anti-inflammatory and anti-bacterial agents. In addition certain of the compounds prepared by this process have utility as intermediates in the preparation of other therapeutic compounds having the above mentioned specific utility as will be described herebelow.

The novel process of this invention comprises the reaction of a di-substituted carbodiimide with a carboxylic acid or ester and the hydrolysis of the resulting imino compound according to the following procedure:

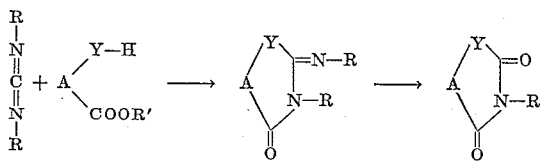

when:

A represents

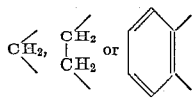

Y represents S, O, NH or N-lower alkyl;
R represents lower alkyl, cycloalkyl having 5–6 carbon atoms, phenyl, benzyl or phenethyl; and
R' represents hydrogen or lower alkyl.

In addition when A represents

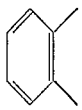

the phenyl moiety is optionally substituted by one or more inert substituents such as halogen, lower alkyl, lower alkoxy, nitro or di-lower alkylamino.

Preferably the process of this invention comprises the reaction of a di-substituted carbodiimide with an o-substituted benzoic acid and hydrolysis of the resulting imino compound as follows:

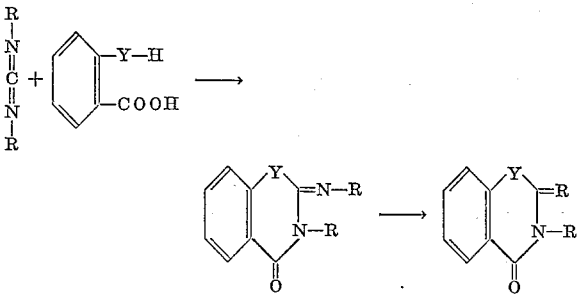

when:

Y represents S, O, NH or N-lower alkyl and
R represents lower alkyl, cycloalkyl having 5–6 carbon atoms, phenyl, benzyl and phenethyl.

The terms "lower alkyl" and "lower alkoxy" where used herein denote aliphatic groups having 1–6 carbon atoms.

According to the first step of the process of this invention, which is a particularly novel and useful and thus preferred step in the process, a carboxylic acid or ester is treated with at least two molar equivalents of a carbodiimide at a reaction temperature of from about 25° to about 100° C. for from about 5 to about 180 minutes. The reaction time and temperature may be increased but without particular advantage. After the reagents are mixed it is useful to add a neutral solvent preferably a solvent which is nonreactive with the carbodiimide such as benzene, chloroform or ethyl ether in order to keep the reaction mixture fluid. Alcohols such as ethanol may be used if an excess of the carbodiimide is present.

The imino compound of Formula I separates from the reaction mixture, is isolated conveniently by filtration and can be purified by recrystallization from a suitable solvent such as an alcohol for example ethanol.

The imino compounds prepared by the reaction of a carboxylic acid or ester and a carbodiimide are hydrolyzed according to the process of this invention to give the corresponding diones having pharmaceutical utility. The hydrolysis is accomplished by treatment of the imino compound with a dilute mineral acid such as sulfuric or hydrochloric acid. The acid catalyzed hydrolysis is preferably carried out in aqueous alkanol solution such as aqueous ethanol or methanol.

The following examples are not limiting but will serve to illustrate the novel process of this invention.

EXAMPLE 1

To 20.6 g. of dicyclohexylcarbodiimide is added 7.7 g. of thiosalicylic acid. To the resulting mixture is added 25 ml. of dry benzene. After one hour the mixture is heated on a steam bath for two hours, then cooled and filtered. Concentrating the filtrate gives a solid material which is recrystallized from ethanol to give 3-cyclohexyl-2-cyclohexylimino-2H-1,3-benzothiazin-4(3H)-one, M.P. 81–84° C.

Two grams of 3-cyclohexyl-2-cyclohexylimino-2H-1,3-benzothiazin-4(3H)-one in 20 ml. of 10% sulfuric acid and 50 ml. of ethanol is refluxed for five hours. The solution is concentrated in vacuo to yield a solid product which is recrystallized from ethanol to give 3-cyclohexyl-2H-1,3-benzothiazine-2,4(3H)-dione, M.P. 150–152° C.

EXAMPLE 2

Thiosalicylic acid (15.4 g.) is added to 25.2 g. of diisopropylcarbodiimide. To the resulting mixture is added 100 ml. of dry benzene. The suspension is allowed to stand for 30 minutes then heated on a steam bath for 2.5 hours. The mixture is filtered and the filtrate is concentrated in vacuo. The resulting oil solidifies and is recrystallized from aqueous ethanol to give 3-isopropyl-2-isopropylimino-2H-1,3-benzothiazin-4(3H)-one, M.P. 51–52° C.

A mixture of 4 g. of 3-isopropyl-2-isopropylimino-2H-1,3-benzothiazin-4(3H)-one is treated with 50 ml. of 10% ethanolic sulfuric acid and refluxed for four hours. Concentrating and recrystallizing the residue from aqueous ethanol gives 3-isopropyl-2H-1,3-benzothiazine-2,4(3H)-dione, M.P. 67–68° C.

EXAMPLE 3

To 19.4 g. of diphenylcarbodiimide is added 7.7 g. of thiosalicylic acid and the resulting mixture is treated with 35 ml. of chloroform. The mixture is heated on a steam bath for three hours, then cooled and filtered. The filtrate is concentrated and the residue is recrystallized from aqueous ethanol to give 3-phenyl-2-phenylimino-2H-1,3-benzothiazin-4(3H)-one.

The above prepared phenylimino compound is refluxed with 10% sulfuric acid in ethanol for five hours. The mixture is concentrated and the residue is recrystallized from ethanol to give 3-phenyl-2H-1,3-benzothiazine-2,4(3H)-dione.

EXAMPLE 4

Four grams of thiosalicylic acid is added to 11.5 g. of dibenzylcarbodiimide and the resulting mixture is treated with dry benzene and heated at 90° C. for two hours. The mixture is filtered and the filtrate is concentrated to yield a solid product which is recrystallized from ethanol to furnish 3-benzyl-2-benzylimino-2H-1,3-benzothiazin-4(3H)-one.

Hydrolysis of this imino compound by refluxing with dilute sulfuric acid in aqueous ethanol gives 3-benzyl-2H-1,3-benzothiazine-2,4(3H)-dione.

EXAMPLE 5

Salicylic acid (3.4 g.) is added to 10.3 g. dicyclohexylcarbodiimide. Treating this mixture with benzene, heating at about 90° C. for three hours and working up as in Example 1 gives 3-cyclohexyl-2-cyclohexylimino-2H-1,3-benzoxazin-4(3H)-one.

A mixture of 5 g. of 3-cyclohexyl-2-cyclohexylimino-2H-1,3-benzoxazin-4(3H)-one in 50 ml. of 10% hydrochloric acid is refluxed for three hours. Concentrating the solution and recrystallizing the residue from ethanol gives 3-cyclohexyl-2H-1,3-benzoxazine-2,4(3H)-dione.

EXAMPLE 6

To 20.6 g. of benzylphenylcarbodiimide is added 6.9 g. of salicylic acid. The resulting mixture is treated with 50 ml. of dry benzene and heated on a steam bath for four hours. Working up as in Example 1 gives a mixture of 3-benzyl-2-phenylimino-2H-1,3-benzoxazin-4(3H)-one and the corresponding 3-phenyl-2-benzylimino compound.

Hydrolysis of these imino compounds by refluxing with 10% sulfuric acid for five hours gives 3-benzyl-2H-1,3-benzoxazine-2,4(3H)-dione and 3-phenyl-2H-1,3-benzoxazine-2,4(3H)-dione, respectively.

EXAMPLE 7

To 9.8 g. of diethylcarbodiimide is added 6.8 g. of o-aminobenzoic acid. The resulting mixture is treated with 25 ml. of dry benzene and allowed to stand for one hour. Heating on a steam bath for two hours, filtering and concentrating the filtrate gives an oil which after chromatographing over alumina gives 3-ethyl-2-ethylimino-2,3-dihydro-4(1H)-quinazolinone.

The above prepared ethylimino compound is refluxed with 10% ethanolic sulfuric acid for two hours to give 3-ethyl-2,4-(1H,3H)-quinazolinedione.

EXAMPLE 8

A mixture of 10.0 g. of cyclohexylphenyl-carbodiimide and 3.7 g. of o-methylaminobenzoic acid is treated with 35 ml. dry ether and allowed to stand at room temperature for 30 minutes. After heating at 90° C. for two hours the mixture is filtered and the filtrate is concentrated in vacuo to give a mixture of 3-cyclohexyl-1-methyl-2-phenylimino-2,3-dihydro-4(1H)-quinazolinone and the corresponding 3-phenyl-2-cyclohexylimino compound.

Hydrolysis of these imino compounds by refluxing with dilute hydrochloric acid furnishes 3-cyclohexyl-1-methyl-2,4(1H,3H)-quinazolinedione and the corresponding 3-phenyl compound.

EXAMPLE 9

Glycolic acid (3.8 g.) is added to 20.6 g. of dicyclohexylcarbodiimide. Treating the resulting mixture with dry benzene, heating at 90° C. for ten minutes and working up as in Example 1 gives 3-cyclohexyl-2-cyclohexylimino-4-oxazolidinone.

One gram of 3-cyclohexyl-2-cyclohexylimino-4-oxazolidinone is refluxed with 10 ml. of 10% ethanolic sulfuric acid for three hours. Concentrating and recrystallizing the residue with aqueous ethanol gives 3-cyclohexyl-2,4-oxazolidinedione.

EXAMPLE 10

To 12.6 g. of diisopropylcarbodiimide is added 5.3 g. of 3-mercaptopropionic acid. To the resulting mixture is added 25 ml. of dry benzene. After heating on a steam bath for 30 minutes the mixture is worked up as in Example 1 to give 3-isopropyl-2-isopropylimino-5,6-dihydro-2H-1,3-thiazin-4(3H)-one.

Hydrolysis of the above prepared imino compound by heating with dilute sulfuric acid gives 3-isopropyl-5,6-dihydro-2H-1,3-thiazine-2,4(3H)-dione.

EXAMPLE 11

The ethyl ester of N-butyl-β-alanine (8.6 g.) is added to 15.4 g. of dibutylcarbodiimide. To the resulting mixture is added 30 ml. of dry benzene. Heating at 60° C. for two hours and working up as in Example 1 gives 3-butyl-2-butylimino-tetrahydro-4(3H)-pyrimidinone.

The above prepared 2-butylimino compound is refluxed for three hours with 10% ethanolic sulfuric acid to give, after concentrating in vacuo and recrystallizing the residue from aqueous ethanol, 3-butylhydrouracil.

EXAMPLE 12

Dicyclohexylcarbodiimide (10.3 g.) is treated with 4.7 g. of 4-chlorothiosalicylic acid. Dry benzene is added and the mixture is heated on a steam bath for two hours to give, after working up as in Example 1, 7-chloro-3-cyclohexyl-2-cyclohexylimino-2H-1,3-benzothiazin-4(3H)-one.

Hydrolyzing this cyclohexylimino compound by refluxing with 10% sulfuric acid in aqueous ethanol furnishes 7-chloro-3-cyclohexyl-2H-1,3-benzothiazine-3,4(3H)-dione.

What is claimed is:
1. The method of preparing heterocyclic compounds of the formula:

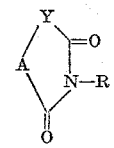

in which
A is a member selected from the group consisting of

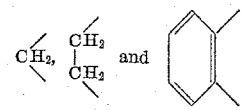

Y is a member selected from the group consisting of S, O, NH and N-lower alkyl and
R is a member selected from the group consisting of lower alkyl, cycloalkyl having 5-6 carbon atoms, phenyl, benzyl and phenethyl which comprises reacting a compound of the formula:

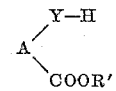

in which:
A and Y are as previously defined and
R' is a member selected from the group consisting of hydrogen and lower alkyl with at least two molar equivalents of a carbodiimide of the formula:

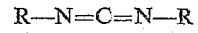

in which R is as previously defined, at a reaction temperature of from about 25° to about 100° C. for from about 5 to about 180 minutes to form an imino compound having the following formula:

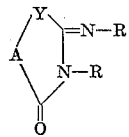

in which A, Y and R are as previously defined and hydrolyzing said imino compound.

2. The method of preparing imino compounds of the formula:

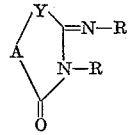

in which:

A is a member selected from the group consisting of

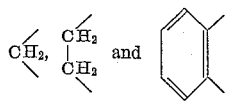

Y is a member selected from the group consisting of S, O, NH and N-lower alkyl and R is a member selected from the group consisting of lower alkyl, cycloalkyl having 5–6 carbon atoms, phenyl, benzyl and phenethyl which comprises reacting a compound of the formula:

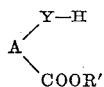

in which:

A and Y are as previously defined and

R' is a member selected from the group consisting of hydrogen and lower alkyl with at least two molar equivalents of a carbodiimide of the formula:

$$R-N=C=N-R$$

in which R is as previously defined, at a reaction temperature of from about 25° to about 100° C. for from about 5 to about 180 minutes.

3. The method of preparing heterocyclic compounds of the formula

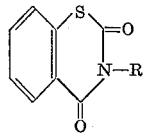

in which R is lower alkyl which comprises reacting a compound of the formula:

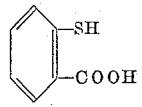

with at least two molar equivalents of a carbodiimide of the formula:

$$R-N=C=N-R$$

in which R is as previously defined, at a reaction temperature of from about 25° to about 100° C. for from about 5 to about 180 minutes to form an imino compound having the following formula:

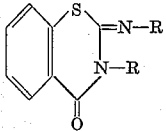

in which R is as previously defined and hydrolyzing said imino compound.

4. The method of preparing imino compounds of the formula:

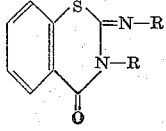

in which R is lower alkyl which comprises reacting a compound of the formula:

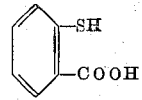

with at least two molar equivalents of a carbodiimide of the formula:

$$R-N=C=N-R$$

in which R is as previously defined, at a reaction temperature of from about 25° to about 100° C. for from about 5 to about 180 minutes.

References Cited in the file of this patent
UNITED STATES PATENTS

| | | |
|---|---|---|
| 2,585,064 | Wheeler et al. | Feb. 12, 1952 |
| 2,784,196 | Bacchetti | Mar. 5, 1957 |

FOREIGN PATENTS

| | | |
|---|---|---|
| 624,416 | Canada | July 25, 1961 |
| 956,499 | Germany | Jan. 17, 1957 |

OTHER REFERENCES

Liebermann et al.: Berichte, vol. 12, pages 1588–95 (1879), QD 1. D4.

Elderfield: Heterocyclic Compounds, vol. 5, pages 496–501 (1957), QD 400 E 4.